United States Patent
Yeh et al.

(10) Patent No.: US 8,956,009 B2
(45) Date of Patent: Feb. 17, 2015

(54) APPARATUS AND METHODS FOR CONTROLLING A THREE-DIMENSIONAL OPTICAL FIELD

(75) Inventors: Jerliang Yeh, Hsinchu (TW); Ling-Yu Tsai, Taichung (TW); Min-Wei Hung, Taipei (TW); Chi-Hung Huang, Taipei (TW); Yu-Cheng Su, Taipei (TW)

(73) Assignee: National Applied Research Laboratory (TW)

( * ) Notice: Subject to any disclaimer, the term of this patent is extended or adjusted under 35 U.S.C. 154(b) by 115 days.

(21) Appl. No.: 13/071,561

(22) Filed: Mar. 25, 2011

(65) Prior Publication Data

US 2011/0235326 A1    Sep. 29, 2011

(30) Foreign Application Priority Data

Mar. 26, 2010    (TW) .............................. 099109257 A

(51) Int. Cl.
| | | |
|---|---|---|
| *F21V 5/04* | (2006.01) | |
| *F21V 14/00* | (2006.01) | |
| *F21V 14/06* | (2006.01) | |
| *G02B 3/12* | (2006.01) | |
| *G02B 3/14* | (2006.01) | |
| *G02B 7/00* | (2006.01) | |
| *G02B 7/10* | (2006.01) | |
| *G02B 15/00* | (2006.01) | |
| *G02B 26/00* | (2006.01) | |
| *G03B 21/00* | (2006.01) | |
| *G03B 21/20* | (2006.01) | |

(52) U.S. Cl.
CPC . *F21V 14/06* (2013.01); *G02B 3/12* (2013.01); *G02B 3/14* (2013.01); *G02B 7/00* (2013.01); *G02B 7/102* (2013.01); *G02B 15/00* (2013.01); *G02B 26/005* (2013.01); *G03B 21/00* (2013.01); *G03B 21/208* (2013.01)
USPC ............ 362/237; 362/238; 362/244; 362/268

(58) Field of Classification Search
CPC ........... F21V 1/00; F21V 14/06; G02B 13/00; G02B 13/16; G02B 13/22; G02B 26/00; G02B 3/12; G02B 3/14; G02B 7/00; G03B 21/00; G03B 21/208
USPC .................. 362/187, 227, 231, 232, 239, 335
See application file for complete search history.

(56) References Cited

U.S. PATENT DOCUMENTS

| | | | |
|---|---|---|---|
| 6,183,086 B1* | 2/2001 | Neubert ........................ | 351/221 |
| 6,369,954 B1* | 4/2002 | Berge et al. .................... | 359/666 |
| 6,402,347 B1* | 6/2002 | Maas et al. ..................... | 362/294 |
| 6,741,404 B2* | 5/2004 | Ue et al. ......................... | 359/811 |
| 6,866,401 B2* | 3/2005 | Sommers et al. ............. | 362/268 |
| 6,939,009 B2* | 9/2005 | Fischer et al. .................. | 353/43 |
| 7,207,677 B2* | 4/2007 | Takeda et al. ................... | 353/31 |
| 7,226,185 B2* | 6/2007 | Dolgin et al. ................. | 362/239 |
| 7,302,181 B2* | 11/2007 | Ng et al. ......................... | 398/88 |
| 7,460,309 B2 | 12/2008 | Venema | |

(Continued)

OTHER PUBLICATIONS

Taiwanese Patent Application Office Action.

*Primary Examiner* — Sikha Roy
(74) *Attorney, Agent, or Firm* — Volpe and Koenig, P.C.

(57) ABSTRACT

The present invention provides an apparatus for controlling a three-dimensional optical field. The apparatus includes a light-emission device and a set of zoom elements. The light-emission device emits a light. The set of zoom elements are disposed in front of the light-emission device, and focus the light from the light-emission device.

7 Claims, 13 Drawing Sheets

(56) References Cited

U.S. PATENT DOCUMENTS

| | | | |
|---|---|---|---|
| 2001/0017985 A1* | 8/2001 | Tsuboi et al. ................. 396/506 |
| 2005/0113912 A1 | 5/2005 | Feenstra et al. |
| 2005/0174775 A1* | 8/2005 | Conner ........................ 362/268 |
| 2007/0133200 A1* | 6/2007 | Uke et al. ..................... 362/202 |
| 2007/0217188 A1* | 9/2007 | Klipstein et al. .............. 362/157 |
| 2008/0100905 A1* | 5/2008 | Kato et al. .................... 359/295 |
| 2008/0117521 A1* | 5/2008 | Krupenkin et al. ........... 359/665 |
| 2010/0046004 A1* | 2/2010 | Lee et al. ...................... 356/603 |
| 2010/0165297 A1* | 7/2010 | Mizushima et al. ........... 353/30 |
| 2011/0085094 A1* | 4/2011 | Kao et al. ......................... 349/5 |

* cited by examiner

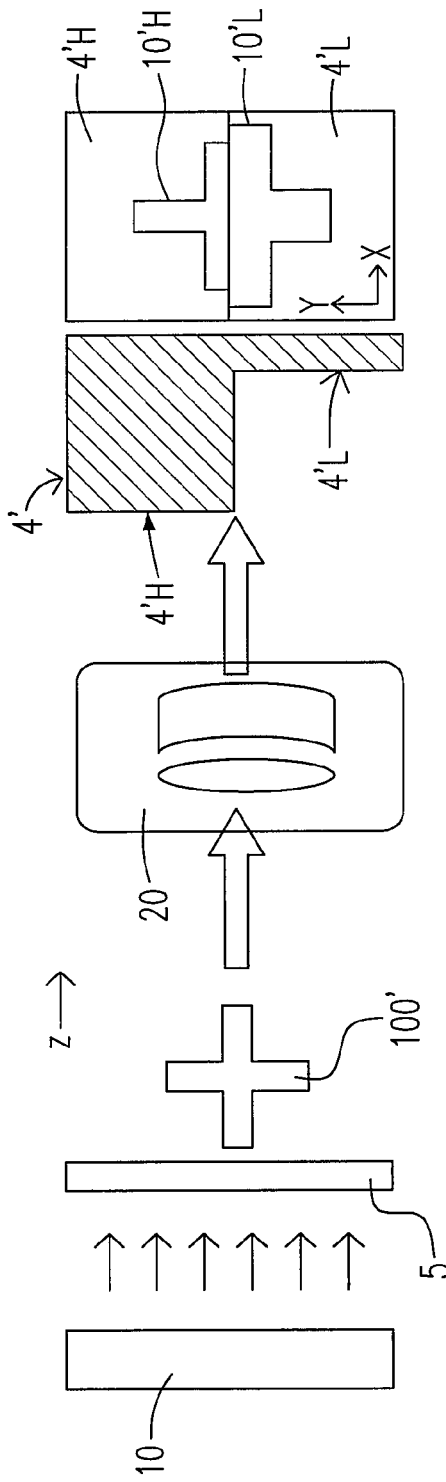
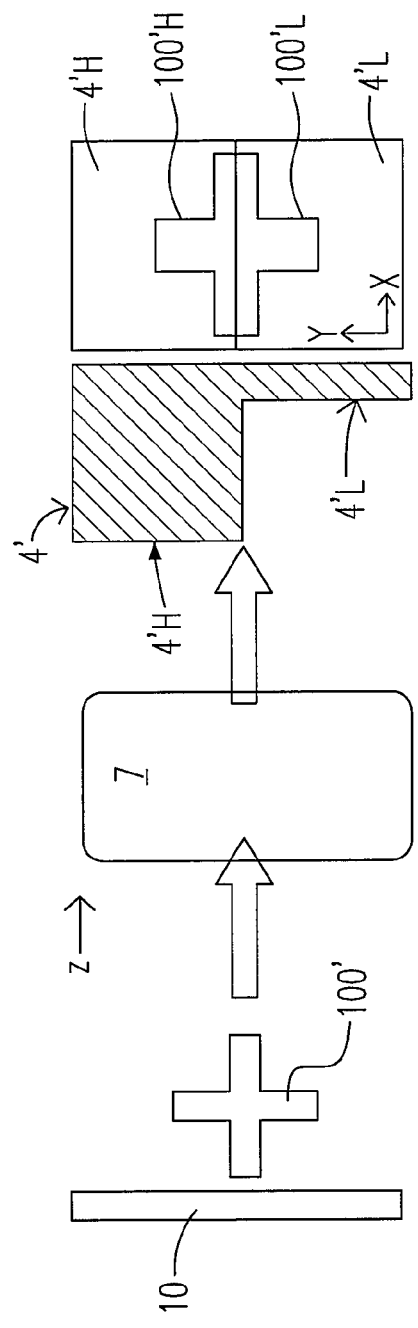
Fig. 15
Fig. 16

APPARATUS AND METHODS FOR CONTROLLING A THREE-DIMENSIONAL OPTICAL FIELD

FIELD OF THE INVENTION

The present invention relates to three-dimensional optical field, particularly an apparatus as well as the method thereof for controlling a three-dimensional optical field.

BACKGROUND OF THE INVENTION

Please refer to FIG. 1, which is a schematic diagram showing a flashlight with a light-focusing function according to the prior art. Lights are emitted from a light source 1, and then are controlled by a lens set 2. Despite by the light-focusing capability of the lens set 2, the focal position of the lights can be changed by controlling the distance between the lens set 2 and the light source 1, i.e. the focal position at the light axis, so as to control the degree of light illumination at a specific position at the light axis. In other words, one may choose to utilize the lens set 2 to let the lights be focused at a location where a higher degree of illumination is needed, and vice versa.

Please refer to FIG. 2, which is a schematic diagram showing another type of flashlight with a light-focusing function according to the prior art. Compared to the type of deflection adopted in FIG. 1, the type of flashlight illustrated in FIG. 2 reflects the lights from the light source 1 to a specific direction by a reflection mirror 3. According to the apparatus shown in FIG. 2, one may choose to allocate the light source 1 at a focus (not shown) of the refection mirror 3 to have the reflected lights be more focused at a smaller area. On the contrary, one may choose to move the light source away from the focus of the refection mirror 3 to let the reflected lights illuminate a broader area.

Please refer to FIG. 3, which is a schematic diagram showing a light-projecting system according to the prior art. In general, lights are emitted from a light source module 10, pass through a deflective zoom module 20, which includes solid or liquid lens to control the projection angle (not shown) of the lights, and illuminate an object 4. Usually the smaller projection angle, the smaller the illuminated area and the higher degree of illumination at the object 4, and vice versa.

Please refer to FIG. 4, which is a schematic diagram showing a two-dimensional photo mask employed in a light-shaping device according to the prior art. A mask 5 is disposed in front of a flat light source 100 to control the shape of the lights. Due to the flat light source 100, the light intensities at different locations of the mask are the same in theory. If there is a specific shape opened on the mask 5, says an open area having a shape of cross 5', the shape of cross 5' will then be projected on the object 4. The light-shaping device illustrated in FIG. 4 is convenience for use. However, it needs a lot of masks 5 when several types and shapes of lights are needed, which could end up with a very large size of the light-shaping device for controlling a whole optical field. Besides, the fact that a large portion of lights are blocked by the mask 5 results in wasteful in terms of energy consuming. Without a zoom device, the shape of cross 5' produced by the light shaping device as illustrated in FIG. 4 is bigger when the distance between the object 4 and the mask 5 is larger, while the degree of illumination thereof decreases. It will be hard to control the dimension of the shape of cross 5'.

Please refer to FIG. 5, which schematics a light source array device. The flat light source array 100 consists of plural light emission device 10a. It can be observed that the flat light source array 100 is a square array from a front view. For a more dense alignment, a honeycomb array is also applicable. A specific light shape can be achieved by selectively illuminating some of the light-emitting devices. However, it is hard for the light source array illustrated in FIG. 5 to control the illumination and the size of the specific light shape without a zoom device.

According to the above-mentioned, there is a need to develop an optical device for controlling a three-dimensional optical field. The optical device is able to generate a specific light shape without a mask, and control the degree of illumination as well as the size of the light shape.

SUMMARY OF THE INVENTION

It is an objective of the present invention to effectively control a three-dimensional optical field. On the one hand, the focal surface at the light axis is optional, i.e., the optical field is controllable along the direction of the light axis. On the other hand, the light shape projected on a two-dimensional space perpendicular to the light axis can also be controllable. More specifically, the method of controlling a three-dimensional light field provided by the present invention makes use of the variation of light emission at a two-dimension surface to control the light shape and the dark/light distribution, and control the illumination or light intensity by zooming the focal position at the one-dimensional light axis, so as to achieve an efficacy of controlling a three-dimensional optical field.

To achieve the abovementioned objective, the present invention provides an apparatus for controlling a three-dimensional optical field. The apparatus includes a light-emission device and a set of zoom elements. The light-emission device emits a light. The set of zoom elements are disposed in front of the light-emission device, and focus the light from the light-emission device.

In accordance with another aspect of the present invention, an apparatus for controlling a three-dimensional optical field is provided. The apparatus comprises a set of zoom light sources. The set of zoom light sources include a plurality of zoom light units, each of which includes a light-emission unit and a first zoom element. The first zoom element is disposed in front of the light-emission unit.

In accordance with a further aspect of the present invention, a method of controlling a three-dimensional optical field is provided. The method includes steps of (a) providing a plurality of zoom light units, each of which has a respective light intensity and a respective focal length; and (b) controlling the three-dimensional optical field by adjusting the respective light intensity and the respective focal length.

The above objects and advantages of the present invention will be more readily apparent to those ordinarily skilled in the art after reading the details set forth in the descriptions and drawings that follow, in which:

BRIEF DESCRIPTION OF THE DRAWINGS

FIGS. 15 to 16 shows a comparison between the apparatus for controlling a three-dimensional optical field according to prior art and that of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
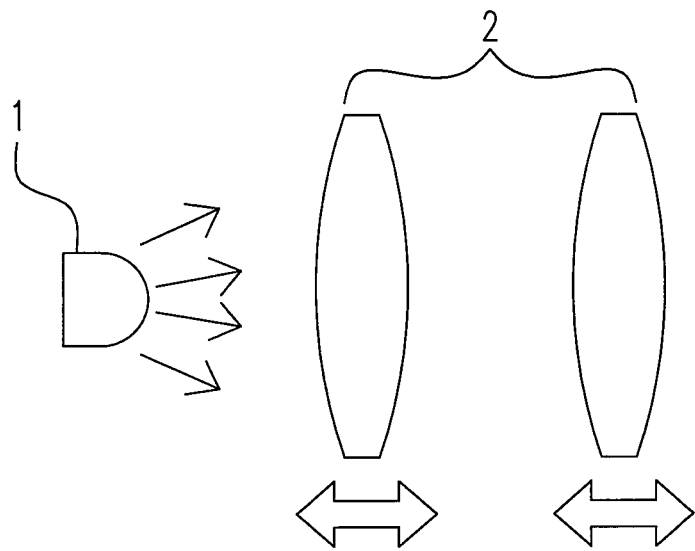
FIG. 1 is a schematic diagram showing a flashlight with a light-focusing function according to the prior art.
Figure 2:
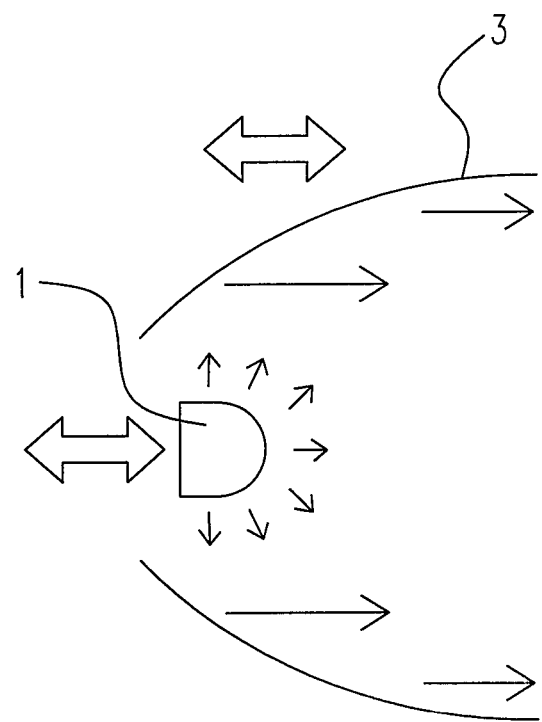
FIG. 2 is a schematic diagram showing another type of flashlight with a light-focusing function according to the prior art.
Figure 3:
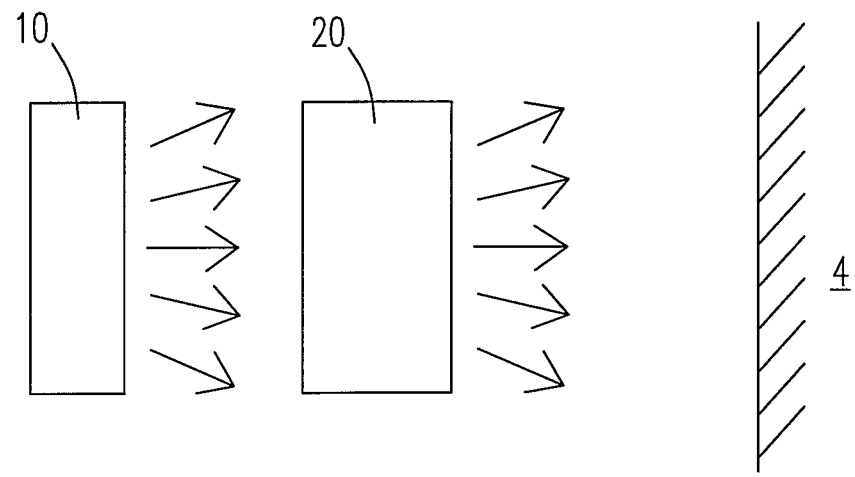
FIG. 3 is a schematic diagram showing a light-projecting system according to the prior art.
Figure 4:
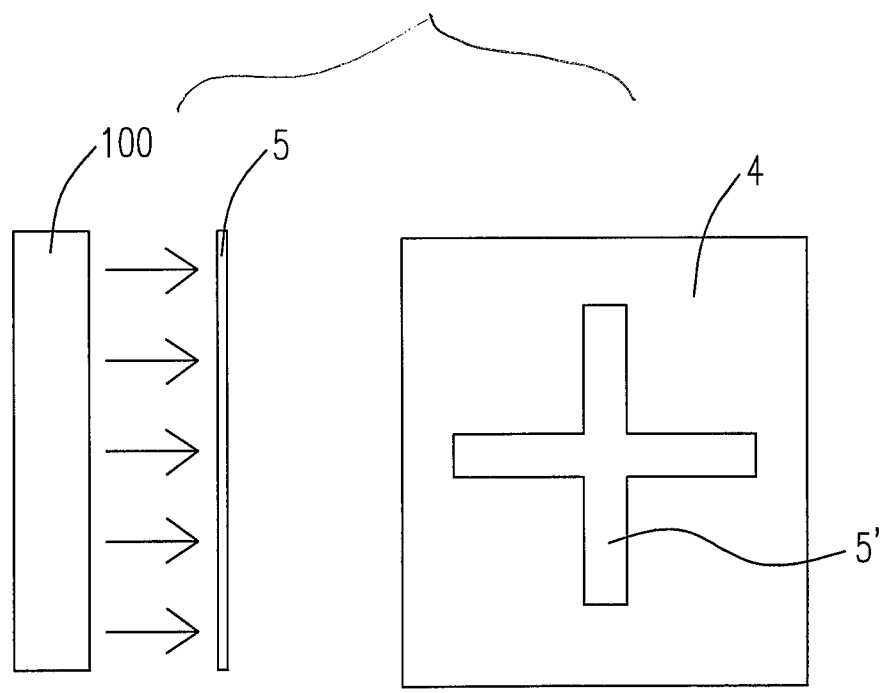
FIG. 4 is a schematic diagram showing a two-dimensional photo mask employed in a light-shaping device according to the prior art.
Figure 5:
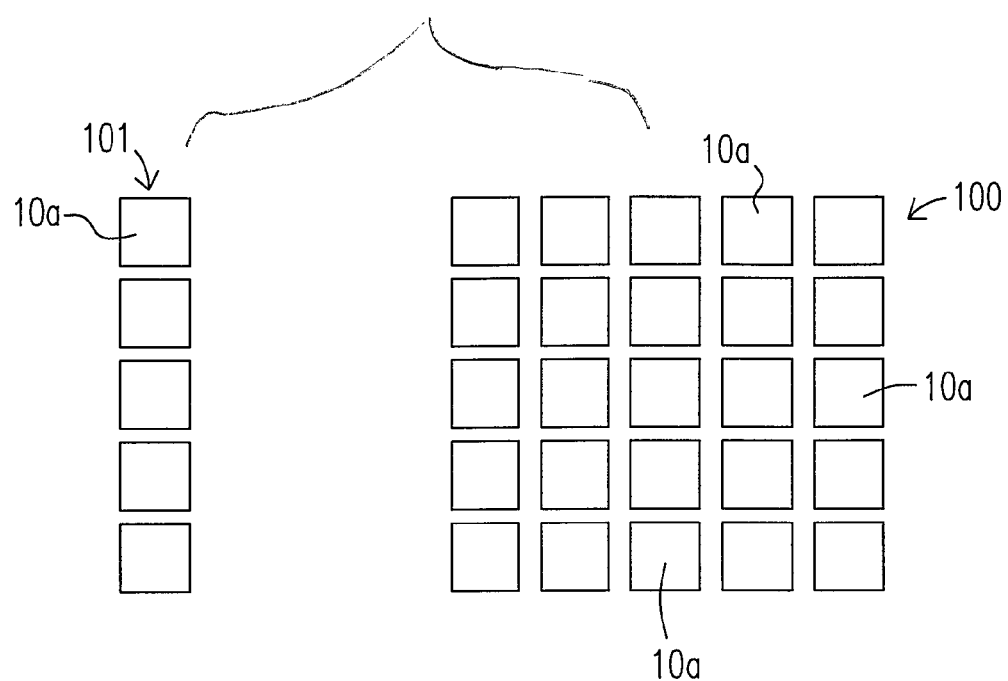
FIG. 5 is a schematic diagram showing a light source array device.
Figure 6:
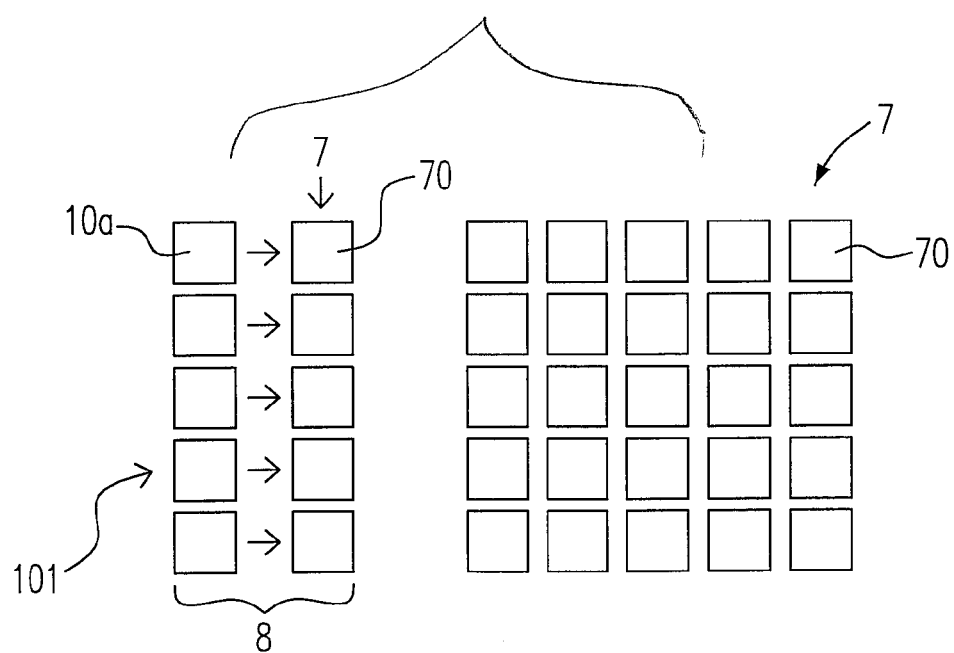
FIG. 6 is a schematic diagram showing an apparatus for controlling a three-dimensional optical field in accordance with one embodiment of the present invention.

Please refer to FIG. 6, which is a schematic diagram showing an apparatus for controlling a three-dimensional optical field in accordance with one embodiment of the present invention. According to FIG. 6, an apparatus for controlling a three-dimensional optical field 8 includes a light-emission array 101 which consists of a plurality of light-emission unit 10a, and a zoom device 7 is disposed in front of the light-emission array 101. The zoom device 7 may also be an array corresponding to the light-emission array 101, to match each of the light-emission unit 10a. According to a preferred embodiment, a zoom unit 70 is disposed in front of each of the plurality of light-emission unit 10a. FIG. 6 illustrates a front view of the apparatus for controlling a three-dimensional optical field 8. It can be observed that those zoom units 70 of the zoom device 7 together form a 5 by 5 array. Noted that the way of disposing the zoom units is not limited to 5 by 5 array or matrix. There are other types of alignment, such as honeycomb array, to be chosen when appropriated.

Figure 7:
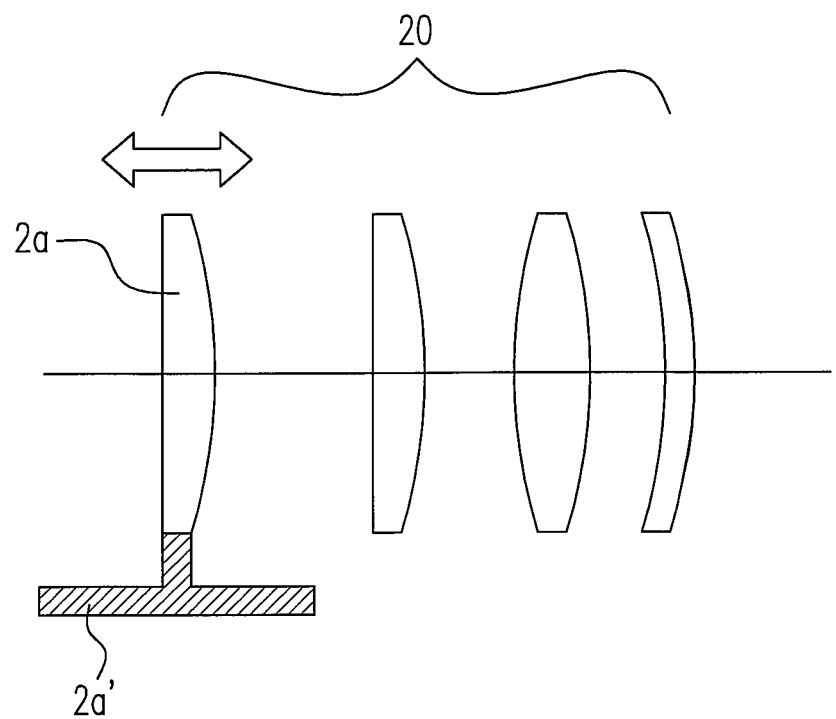
FIG. 7 is a schematic diagram showing an optical zoom device.

Please refer to FIG. 7, which schematics an optical zoom device. A lens set 20 includes several solid lenses. The way of zooming is made by moving a solid lens 2a of the lens set 20. According to FIG. 7, the solid lens 2a is disposed on a zoom mechanism 2a' for controlling the movement of the solid lens 2a.

Based on the combination of FIGS. 6 and 7, the apparatus for controlling a three-dimensional optical field 8 according to the present invention is able to control the focal position of each of the light-emission unit 10a individually via the zoom unit 70 in front of each light-emission unit 10a.

Figure 8:
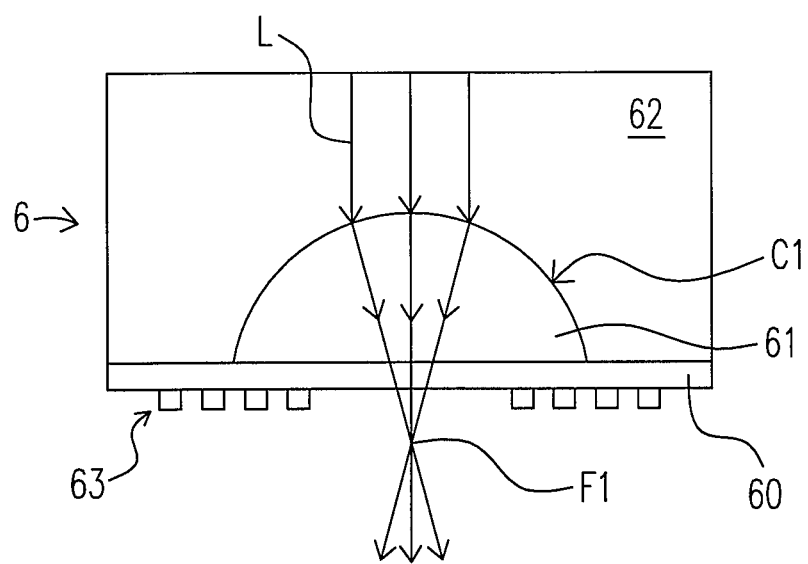
FIGS. 8 and 9 are schematic diagrams illustrating the liquid lens utilized by the present invention.
Figure 9:
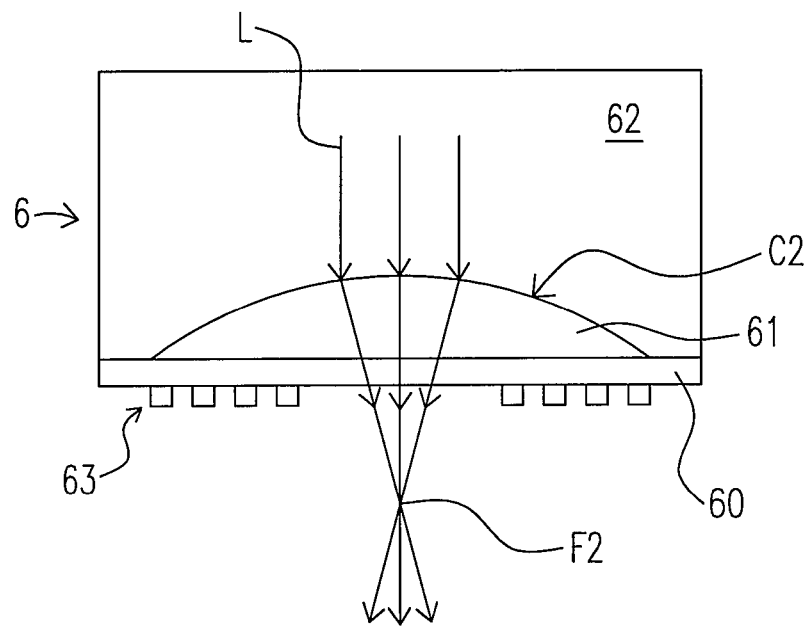

Please refer to FIGS. 8 and 9, which schematic a liquid lens utilized by the present invention. According to FIG. 8, a liquid lens 6 contains a first liquid 61 and a second liquid 62. The first and the second liquids 61, 62 do not solve each other. Therefore, there will not occur any solution or mixing of the two liquids inside the liquid lens 6, and there exists an interface therebetween. A plurality of electrodes 63 are disposed under a control plate 60 where the first liquid 61 is disposed thereon, to control a first curvature C1 of the interface between the first and the second liquids 61, 62. When parallel lights L enters from the top into the liquid lens 6 and meet the interface, they are deflected toward a focus F1 due to the first curvature C1. In FIG. 9, a curvature C2 of the interface between the first and second liquids 61, 62 is produced by controlling the electrodes 63. Similarly, lights L are deflected toward a second focus F2 due to the second curvature C2. Since the first curvature C1 is larger than the second curvature C2, it appears that the location of the first focus F1 is closer to the liquid lens 6. Therefore, the focal point of the liquid lens 6 can be controlled by the plurality of electrodes 63. The skilled person in the art may use the liquid lens 6 as the zoom unit 70 illustrated in FIG. 6.

Figure 10:
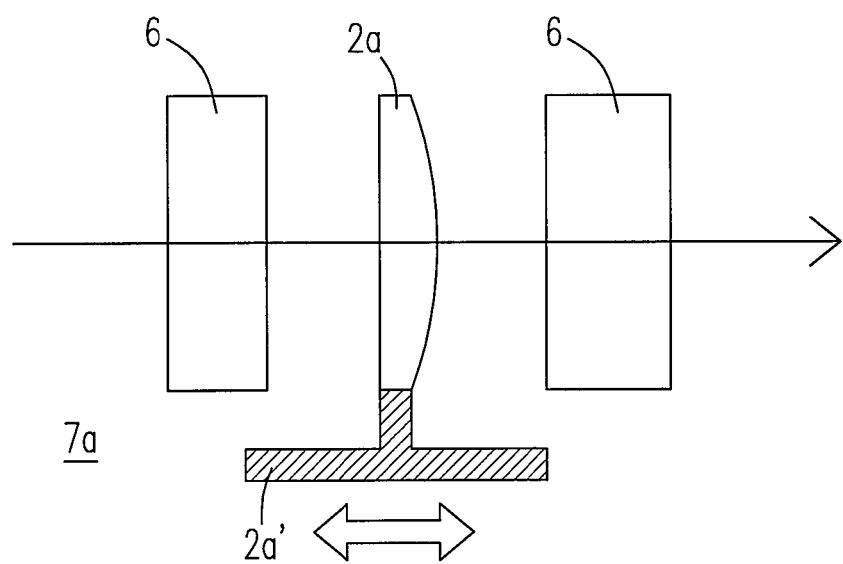
FIGS. 10 and 11 are schematic diagrams showing lens assemblies utilized by the present invention.
Figure 11:
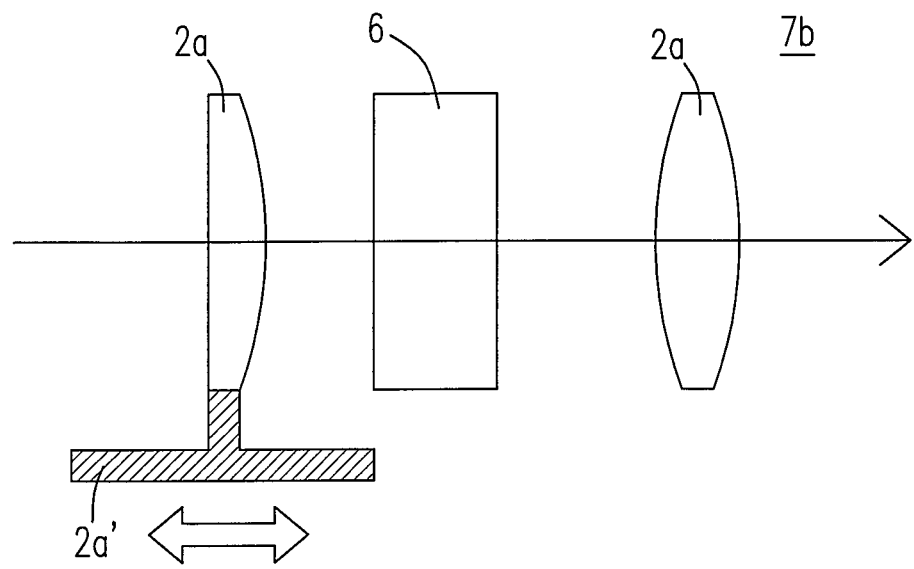

FIGS. 10 and 11 schematic lens assemblies utilized by the present invention. The effect of focusing can be better achieved by a combination of lenses rather than a single lens, either solid or liquid one. In FIG. 10, a solid lens 2a controlled by a zoom mechanism 2a' is disposed between two liquid lenses 6. In FIG. 11, a liquid lens 6 is disposed between two solid lenses 2a, while one of the solid lenses 2a is controlled by a zoom mechanism 2a'. Zoom effect is available for both the liquid lenses 6 and the zoom mechanism 2a'. One may choose to take advantage of the zoom function of either the liquid lens or the solid lens with zoom mechanism, or both, for a better zooming result.

Figure 12:
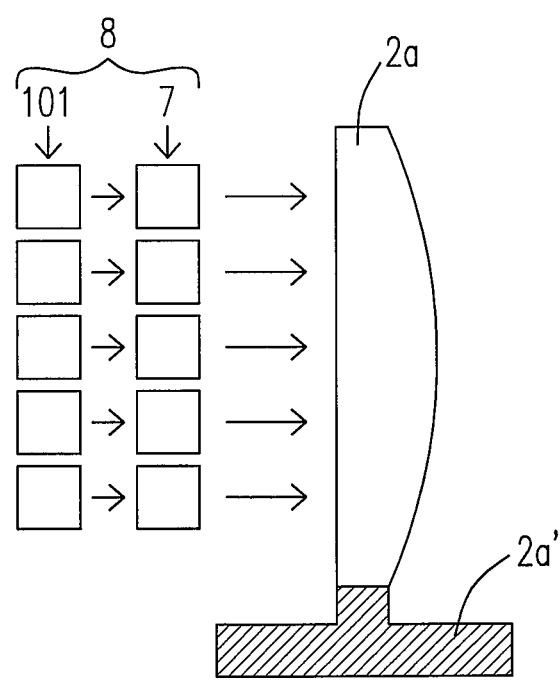
FIG. 12 is a schematic diagram showing an apparatus for controlling a three-dimensional optical field in accordance with another embodiment of the present invention.

Refer to FIG. 12, which is a schematic diagram showing another embodiment of the present invention. A solid lens 2a is disposed in front of the apparatus for controlling a three-dimensional optical field 8, while lights are emitted from left to right according to the illustration in FIG. 12. A zooming device 2a' is furnished with the solid lens 2a for controlling the position thereof to move along the light axis for intended zoom effect. It can also be observed that the embodiment employs a first zoom device 7 and a second zoom device 2a from the illustration of FIG. 12.

Figure 13:
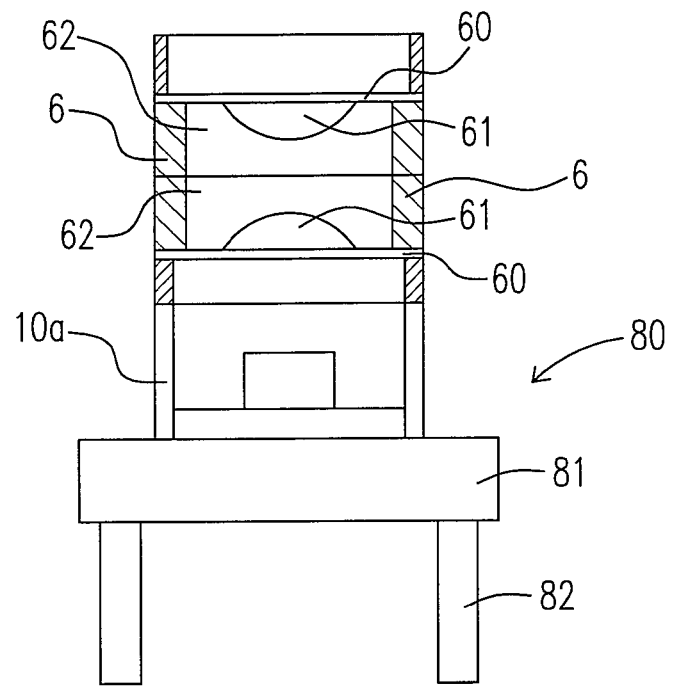
FIG. 13 is a schematic diagram showing an embodiment of the zoom light source in accordance with the present invention.

Refer to FIG. 13, which is a schematic diagram showing an embodiment of the zoom light source in accordance with the present invention. According to FIG. 6, both the light-emission array 101 and the zoom device 7 consist plural units. It would be a convenient design if each of the light-emission unit 10a were equipped with a zoom device 7. According to FIG. 13, A zoom light-emission unit 80 comprises an electrical circuit 81 with a light-emission unit 10a thereon. At least a liquid lens 6, or a combination of two liquid lenses 6, is disposed on top of the light-emission unit 10a for controlling zooming or focusing of the lights emitted from the light-emission unit 10a. Preferably, the light-emission unit 10a is an LED, an incandescent lamp, a mercury lamp, a halogen lamp or a tritium light. The way how to perform the zoom function for the liquid lens 6 has been described thereinbefore, so there is no need to repeat. It can be observed from the illustrations in FIG. 13 that, there are two control plates 60 located at different positions.

Figure 14:
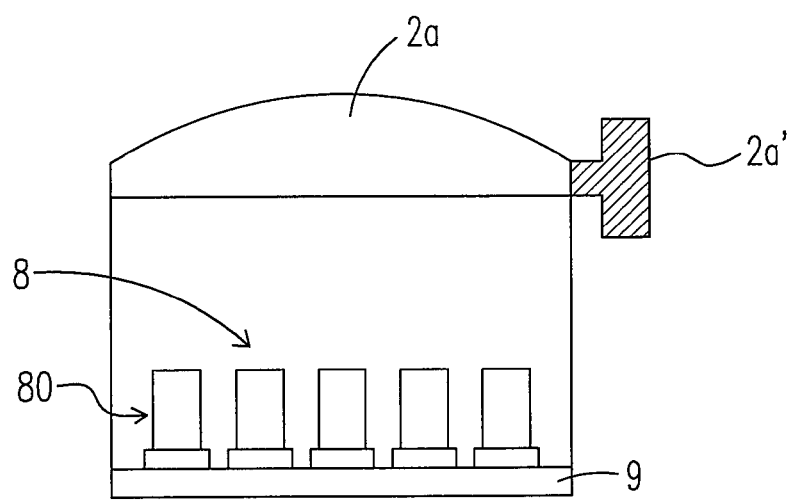
FIG. 14 is an embodiment of the apparatus for controlling a three-dimensional optical field employing the light-emission units according to the present invention.

Please refer to FIG. 14, which schematics an embodiment of the apparatus for controlling a three-dimensional optical field 8 employing the light-emission units 80. A plurality of the light-emission units 80 are disposed on a substrate 9 to construct the apparatus for controlling a three-dimensional optical field 8. A solid lens 2a equipped with a zoom mechanism 2a' is further disposed in front of the apparatus for controlling a three-dimensional optical field 8, according to FIG. 14.

FIGS. 15 and 16 shows a comparison between the apparatus for controlling a three-dimensional optical field according to prior art and that of the present invention. Referring to FIG. 15, a mask 5 is disposed in front of the light-emission module 10 for obtaining a light with a shape 100'. The light with the shape 100' passes through a zoom module 20 and then is projected on an object 4' comprising a higher portion 4'H and a lower portion 4'L. It appears the distance from the zoom module 20 to the higher portion 4'H is shorter than that to the lower portion 4'L, so the degree of illumination at the higher portion 4'H is higher while the size of the light shape 10'H projected on the higher portion 4'H is smaller than that of the light shape 10'L on the lower portion 4'L. Therefore, a homogeneous light shape at the object 4' cannot be achieved by using the traditional apparatus for controlling a three-dimensional optical field.

FIG. 16 schematics the application of the apparatus for controlling a three-dimensional optical field according to the present invention. A set of light-emission units 10a are aligned to form a light source array 100 and generate the same light shape 100'. The light shape 100's is projected on the same object 4' via a zoom array 7. Notably, lights emitted from those light-emission units 10a for composing the upper half of the light shape are projected and focused on the higher portion 4'H of the object 4' to form a light shape 100'H, while lights emitted from those light-emission units 10a for composing the lower half of the light shape are projected and focused on the lower portion 4'L of the object 4' to form another light shape 100'L. The light shape 100'H and the light shape 100'L together compose a light shape similar to the light shape 100'. An optical field with homogeneous illumination and dimension can be obtained by such a method. Therefore, the present invention makes use of the variation of light emission at a two-dimension surface, which is achieved by control the plurality of light-emission units, to control the light shape and the dark/light distribution, and control the illumination or light intensity by zooming the focal position at the one-dimensional light axis with the aide of the zoom array 7, so as to achieve an efficacy of controlling a three-dimensional optical field.

Figure 17:
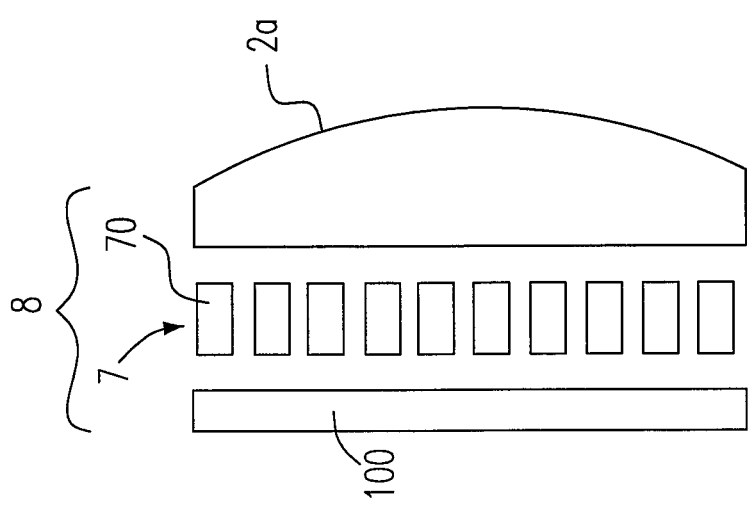
FIG. 17 a schematic diagram showing the embodiment employing a single light source according to the present invention.

FIG. 17 is a schematic diagram showing the embodiment employing a single light source according to the present invention. The apparatus for controlling a three-dimensional optical field 8 includes a flat light source 100, a zoom device comprising a set of plural zoom units 70 usually in array and a solid lens 2a for control the zoom effect. A light shape (not shown) can be obtained by adjusting those zoom units 70.

Figure 18:
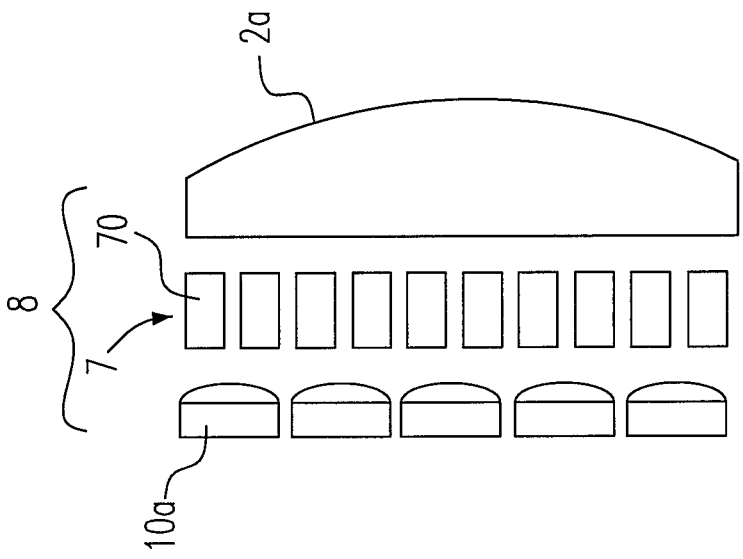
FIGS. 18 and 19 are schematic diagrams showing apparatus for controlling a three-dimensional optical field in accordance with other embodiments of the present invention.

FIG. 18 shows another embodiment of the apparatus for controlling a three-dimensional optical field according to the present invention. Compared with the illustrations in FIG. 17, it can be observed that there are a plurality of light emission units 10a disposed therein, and each of the plurality of light-emission units 10a matches two zoom units 70 of the zoom array 7. Such an alignment is particularly appropriate for using incandescent lamp, mercury lamp, halogen lamp or tritium light as the light source, because these light sources have strong light-emission power and larger size.

Figure 19:
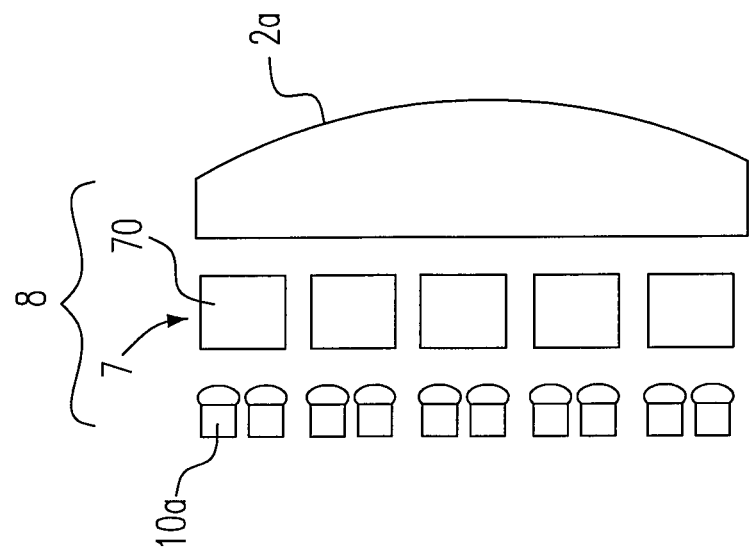

FIG. 19 shows another embodiment of the apparatus for controlling a three-dimensional optical field according to the present invention. One may observe that every two light-emission units 10a match one zoom unit 70 from the illustrations in FIG. 19. Practically, one may choose to use three or more light-emission units 10a to match one zoom unit 70. For example, it is popular to dispose three light-emission units 10a, which emit the three primary colors respectively, to match a zoom unit 70, and project the mixed color light to an object such as a screen. It can be realized from the illustrations in FIGS. 17-19 that the present invention offers good flexibility to designers for different applications.

Figure 20:
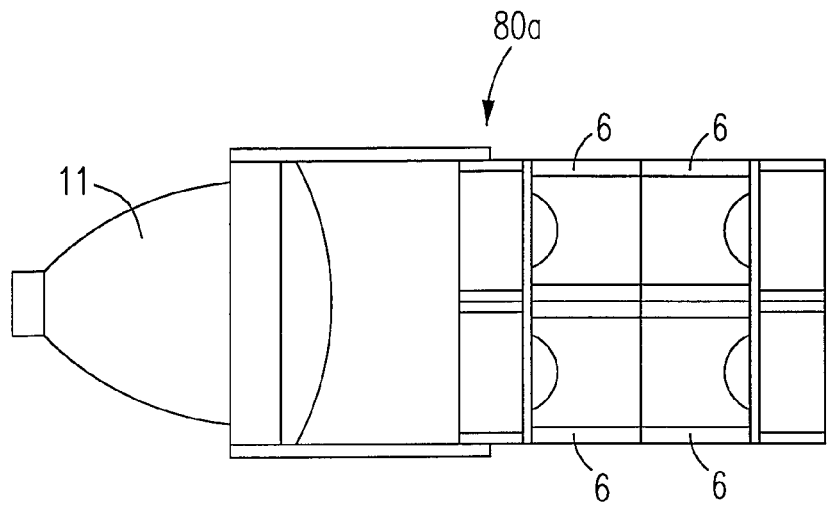
FIGS. 20 to 22 are schematic diagrams showing embodiments of the zoom light-emission units according to the present invention.

Please refer to FIG. 20, which is a schematic diagram for another embodiment of a zoom light-emission unit according to the present invention. According to FIG. 20, a first multiple zoom light-emission unit 80a includes a large light-emission unit 11 and a plurality of liquid lenses 6 disposed in front of the large light-emission unit 11. Referring to the structure illustrated in FIG. 18 and the descriptions thereof, it is convenient for one to construct the apparatus for controlling a three-dimensional optical field 8 if each of the light-emission unit 80a consists of a large light-emission unit 11 and a plurality of liquid lenses 6. What the designer needs to do is simply disposing a plurality of the light-emission units 80a into a square matrix or a honeycomb array.

Figure 21:
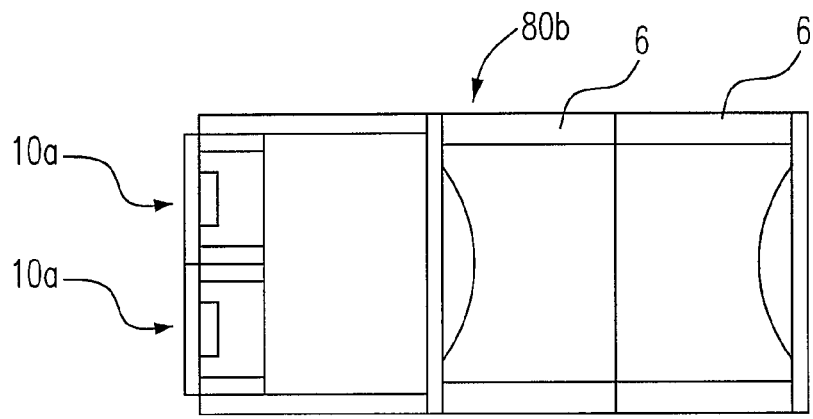

Please refer to FIG. 21, which is a schematic diagram for another embodiment of a zoom light-emission unit according to the present invention. According to FIG. 21, a second multiple zoom light-emission unit 80b includes a liquid lens 6 and a plurality of light-emission units 10a disposed at the other end. Referring to the structure illustrated in FIG. 19 and the descriptions thereof, it is convenient for one to construct the apparatus for controlling a three-dimensional optical field 8 if a larger liquid lens 6 and a plurality of light-emission units 10a are integrated into a light-emission unit 80b. A user may dispose a plurality of the light-emission units 80b into a square matrix or a honeycomb alignment as per requirements.

Figure 22:
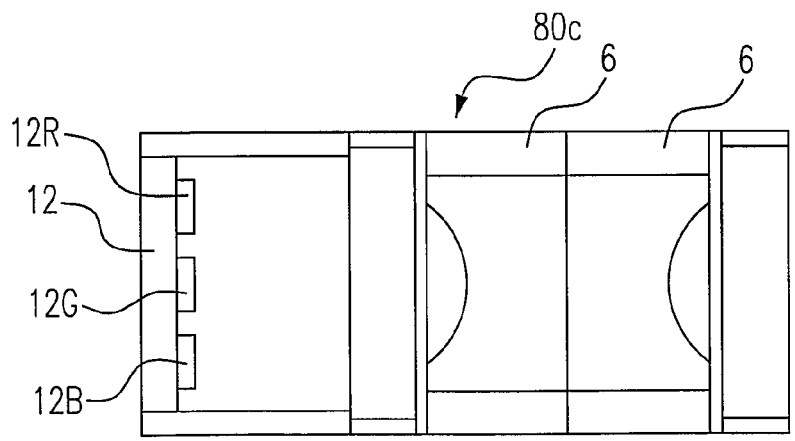

FIG. 22 shows another embodiment of the apparatus for controlling a three-dimensional optical field according to the present invention. According to FIG. 22, a third multiple zoom light-emission unit 80c includes a liquid lens 6 and a multiple light-emission unit 12 disposed at the other end. Similar to the usage of color mixing, one may choose to use three light-emission units 12R, 12G and 12B, which emits the three primary colors respectively, on a circuit to produce the multiple light-emission unit 12.

Although the liquid lens 6 is introduced in FIGS. 20-22 as the means for zooming, some other options such as the embodiments illustrated in FIGS. 7, 10 and 11 may also be applicable.

Figure 23:
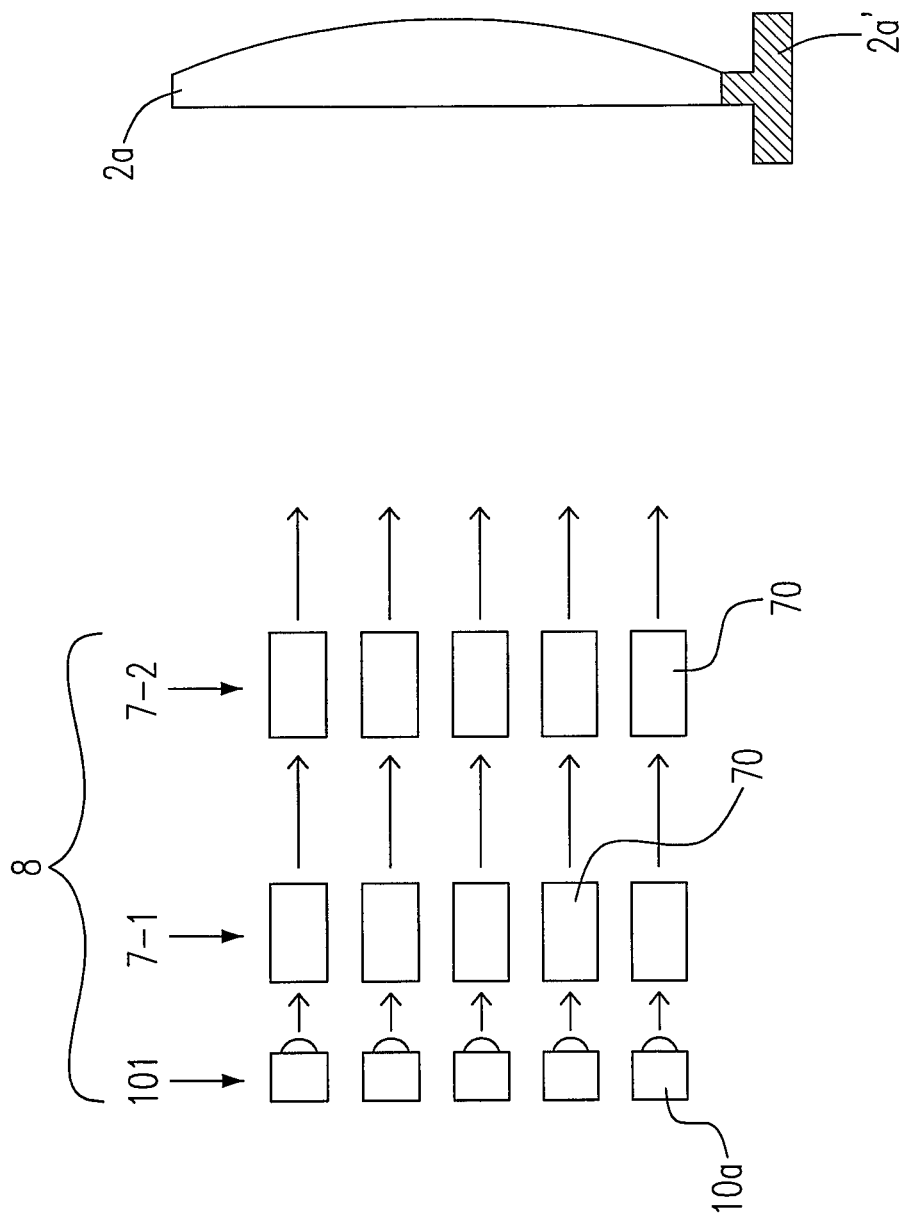
FIG. 23 is a schematic diagram showing one another embodiment of the apparatus for controlling a three-dimensional optical field according to the present invention.

FIG. 23 shows one another embodiment of the apparatus for controlling a three-dimensional optical field according to the present invention. The apparatus for controlling a three-dimensional optical field 8 comprises a light source array 101 including a plurality of light-emission units 10a, a first set of zoom elements 7-1 disposed in front of the light source array 101, and a second set of zoom elements 7-2 disposed in front of the first set of zoom elements 7-1. According to FIG. 23, a solid lens 2a on a zoom mechanism 2a' is further disposed in front of the apparatus 8 for increasing the flexibility of use, such as increasing effective focus length. Both the first and second sets of zoom elements 7-1, 7-2 consist of a plurality of zoom elements as described in any one embodiment illustrated in FIGS. 7 to 11, or any combination thereof.

Figure 24:
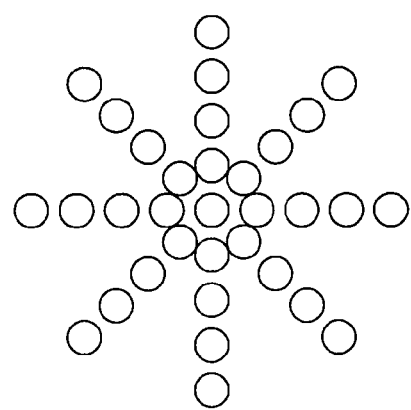
FIGS. 24 to 26 schematic the types of alignments of the light-emission units and the zoom devices allocated on a surface according to the present invention.
Figure 25:
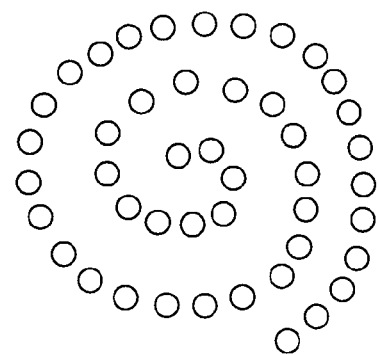
Figure 26:
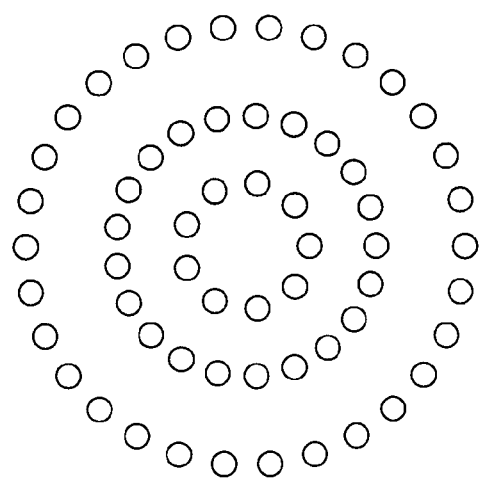

FIGS. 24 to 26 schematic the types of alignments of the light-emission units and the zoom devices allocated on a surface according to the present invention. In FIG. 24, the elements are disposed according to a radial aliment. In FIG. 25, the elements are disposed according to a shape of a whirlpool or spiral aliment. In FIG. 26, the elements are disposed according to an aliment of concentric circles. Obviously, similar aliments such as non-concentric circles or ellipses may be options for one to choose.

Figure 27:
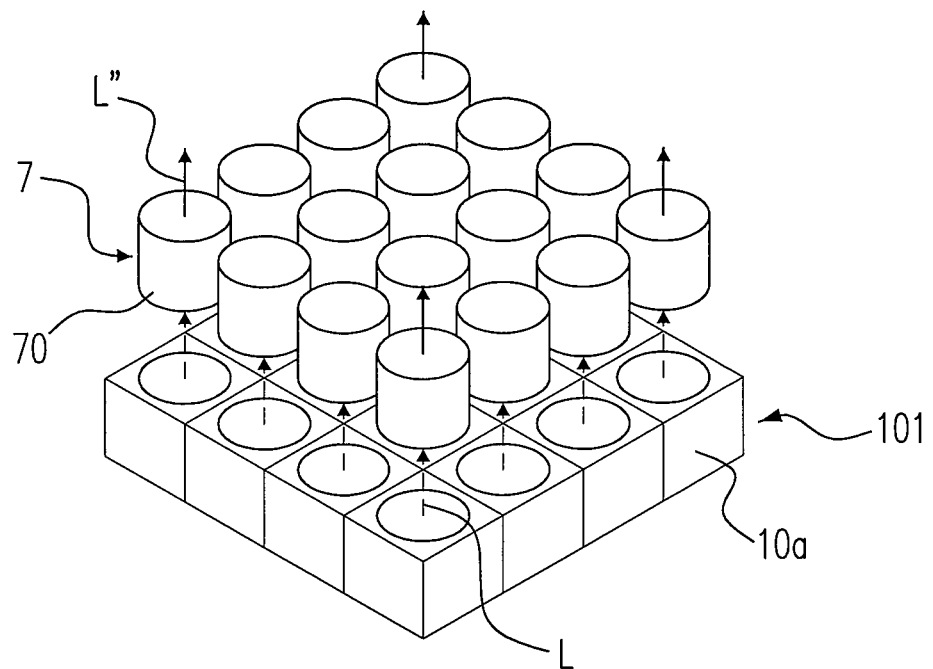
FIGS. 27 and 28 are three-dimensional schematic diagrams showing the embodiments of the present invention.

FIG. 27 is a three-dimensional schematic diagram showing the embodiments of the present invention. A light source array 101 consisting of a set of light-emission units 10a emits lights L to a corresponding zoom device 7 which is a set of zoon units 70. The zoom device 7 focuses the light L and project the focused light L" out of the device.

Figure 28:
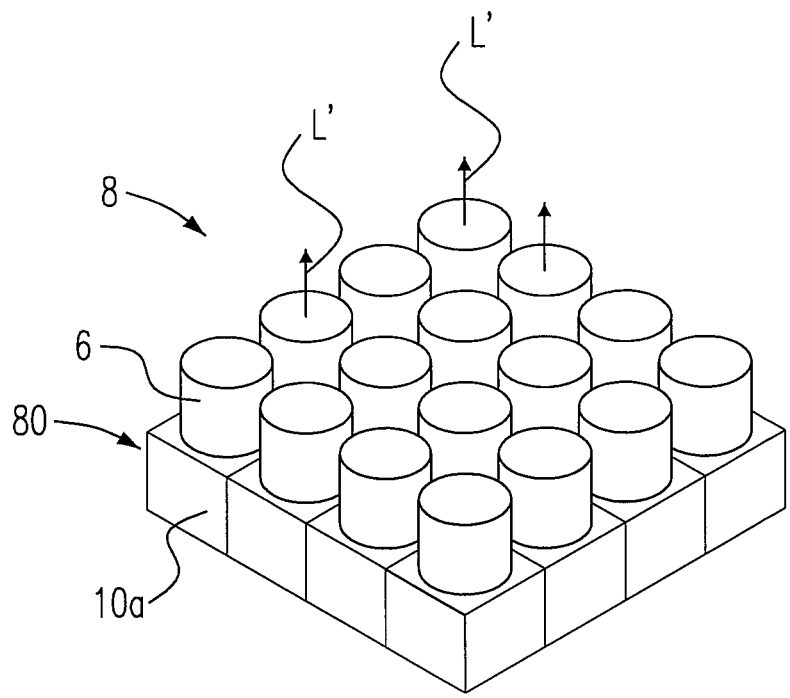

FIG. 28 is a three-dimensional schematic diagram showing some another embodiments of the present invention, in which the apparatus for controlling a three-dimensional optical field 8 is a set of zoom light-emission elements 80. The illustration in FIG. 28 shows the zoom light-emission elements 80 are disposed as a square array for example. Each of the zoom light-emission elements 80 comprises a light-emission unit 10a and a lens 6. Details of the functions of each element has been set forth above, so there is no need to repeat.

According to the above, the present invention provides a variety of apparatus as well as methods for disposing light-emission units and zoom elements. They can be implemented for accurately controlling the focal position of the light emitted from each of the light-emission unit, and can be applied to the situation that an object has several surfaces at different focal lengths. Besides, the present invention introduces a zoom light-emission unit which is a combination of at least a light source and a zoom unit based on requirements, for the convenience of use.

EMBODIMENTS

1. An apparatus for controlling a three-dimensional optical field, comprising:
    a light-emission device emitting a light; and
    a set of zoom elements disposed in front of the light-emission device, and focusing the light from the light-emission device.
2. The apparatus of embodiment 1, wherein the set of zoom elements comprise a plurality of first zoom elements.
3. The apparatus of embodiment 1, further comprising a second zoom element disposed in front of the set of zoom elements.
4. The apparatus of embodiment 1, wherein the light-emission device is one of a plane light source and a set of light-emission units.
5. The apparatus of embodiment 4, wherein each of the light-emission units comprises one selected from a group consisting of an LED, an incandescent lamp, a mercury lamp, a halogen lamp and a tritium light.
6. The apparatus of embodiment 4, wherein the set of zoom elements have a portion corresponding to a single one of the set of light-emission units.
7. An apparatus as claimed in claim 4, wherein the set of light-emission units have a portion corresponding to a single one of the set of zoom elements.
8. The apparatus of embodiment 1, wherein each of the set of zoom elements includes one selected from a group consisting of a liquid lens, a solid lens and a combination thereof.
9. An apparatus for controlling a three-dimensional optical field, the apparatus comprising a set of zoom light sources, wherein the set of zoom light sources include a plurality of zoom light units, each of which includes a light-emission unit and a first zoom element disposed in front of the light-emission unit.
10. The apparatus of embodiment 9, wherein the first zoom element includes one selected from a group consisting of a liquid lens, a solid lens and a combination thereof.
11. The apparatus of embodiment 9, wherein the light-emission unit comprises one selected from a group consisting of an LED, an incandescent lamp, a mercury lamp, a halogen lamp and a tritium light.
12. The apparatus of embodiment 9, wherein each of the zoom light units comprises a plurality of light-emission units, and the first zoom element is a single zoom element.
13. The apparatus of embodiment 9, wherein the first zoom element further comprises a plurality of zoom elements, and the light-emission unit is a single unit.
14. The apparatus of embodiment 9, further comprising a second zoom element disposed in front of the first zoom element.
15. A method of controlling a three-dimensional optical field, comprising steps of:
    providing a plurality of zoom light units, each of which has a respective light intensity and a respective focal length; and
    controlling the three-dimensional optical field by adjusting the respective light intensity and the respective focal length.
16. The method of embodiment 15, wherein a two-dimensional light shape is controlled by a variation of an intensity of the plurality of zoom light units, and a focal plane at a light axis is controlled by a zooming action of the zoom light units, so as to control the three-dimension optical field.
17. The method of embodiment 15, wherein the zoom light units includes one selected from a group consisting a liquid lens, a solid lens and a combination thereof.
18. The method of embodiment 15, further comprising a step of providing a second zoom light unit in front of the plurality of zoom light units.
19. The method of embodiment 15, wherein the zoom light units comprise a plurality of light-emission units.
20. The method of embodiment 15, wherein each of the zoom light units comprises a light source, and the light source is a single light-emission unit.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims that are to be accorded with the broadest interpretation so as to encompass all such modifications and similar structures.

What is claimed is:
1. An apparatus for controlling a three-dimensional optical field, comprising:
    a light-emission device emitting a light for projecting an original light shape; and
    a set of zoom elements disposed in front of the light-emission device, and focusing the light emitted from the light-emission device and along a light axis, and passing therethrough to project the light onto an external object, wherein:

the light-emission device has a plurality of portions, and each of which corresponds to a single one of the set of zoom elements;

the set of zoom elements comprise a plurality of first zoom elements, and each of the set of zoom elements includes a liquid lens;

the external object has a first and a second portions which are separated by a specific distance along the light axis; and the light passing through the set of zoom elements is projected onto the first portion to form a first sub-shape on the first portion and projected onto the second portion to form a second sub-shape on the second portion, the first and the second sub-shapes form a combined light shape when observed along the light axis, and the combined light shape has a contour essentially free from a distortion.

2. An apparatus as claimed in claim 1, further comprising a plurality of second zoom elements respectively disposed in front of the plurality of first zoom elements.

3. An apparatus as claimed in claim 1, wherein the light-emission device is one of a plane light source and a set of light-emission units.

4. An apparatus as claimed in claim 3, wherein each of the light-emission units comprises one selected from a group consisting of an LED, an incandescent lamp, a mercury lamp, a halogen lamp and a tritium light.

5. An apparatus as claimed in claim 3, wherein the set of zoom elements have a portion corresponding to a single one of the set of light-emission units.

6. An apparatus as claimed in claim 1, wherein the first and the second sub-shapes have a first and a second illuminations respectively, and the first illumination is essentially identical to the second illumination.

7. An apparatus as claimed in claim 1, wherein the combined light shape is essentially identical to the original light shape.

* * * * *